US011881160B1

(12) United States Patent
Yoon et al.

(10) Patent No.: US 11,881,160 B1
(45) Date of Patent: Jan. 23, 2024

(54) DISPLAY DEVICE AND METHOD OF DRIVING THE SAME

(71) Applicant: SAMSUNG DISPLAY CO., LTD., Yongin-si (KR)

(72) Inventors: Hyun Sik Yoon, Yongin-si (KR); Jong Woon Kim, Yongin-si (KR); Won Jin Seo, Yongin-si (KR); Ki Hyun Sung, Yongin-si (KR); Ye Seul Lee, Yongin-si (KR); Dae Ho Hwang, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/107,409

(22) Filed: Feb. 8, 2023

(30) Foreign Application Priority Data

Jul. 14, 2022 (KR) ........................ 10-2022-0087195

(51) Int. Cl.
*G09G 3/32* (2016.01)

(52) U.S. Cl.
CPC ........... *G09G 3/32* (2013.01); *G09G 2310/08* (2013.01); *G09G 2320/0271* (2013.01); *G09G 2330/04* (2013.01)

(58) Field of Classification Search
CPC ....... G09G 3/32–3291; G09G 2310/08; G09G 2320/0271; G09G 2330/04
See application file for complete search history.

(56) References Cited

U.S. PATENT DOCUMENTS

| | | | | |
|---|---|---|---|---|
| 7,773,105 | B2 | 8/2010 | Yamada | |
| 8,854,399 | B2 * | 10/2014 | Arkhipov | G09G 3/32 345/208 |
| 9,318,042 | B2 * | 4/2016 | Shin | G09G 3/2022 |
| 10,600,377 | B2 * | 3/2020 | Zha | G09G 3/3406 |
| 11,127,345 | B1 | 9/2021 | Seo et al. | |
| 11,398,182 | B2 * | 7/2022 | Park | G09G 3/3233 |
| 2021/0012704 | A1 * | 1/2021 | Pyun | G09G 3/32 |
| 2022/0157232 | A1 * | 5/2022 | Pyun | G09G 3/32 |

FOREIGN PATENT DOCUMENTS

| | | | |
|---|---|---|---|
| EP | 3038084 | B1 | 6/2016 |
| KR | 1020070092608 | A | 9/2007 |
| KR | 101731120 | B1 | 4/2017 |
| KR | 1020210116834 | A | 9/2021 |

* cited by examiner

*Primary Examiner* — Gene W Lee
(74) *Attorney, Agent, or Firm* — CANTOR COLBURN LLP

(57) ABSTRACT

A display device includes: a pixel component including pixels; a timing controller configured to calculate a load variation between previous input grayscale values corresponding to a previous frame and current input grayscale values corresponding to a current frame; a current sensor configured to sense a current flowing through the pixels during the current frame and generate a global current value for the sensed current, store time points at which the global current value becomes equal to preset threshold current values, respectively, and generate a global current variation rate corresponding to a section between the stored time points of the current frame; and a scale factor provider configured to control a scale factor in a period of the current frame in the case where the load variation is equal to or more than a reference load variation.

20 Claims, 9 Drawing Sheets

DISPLAY DEVICE AND METHOD OF DRIVING THE SAME

DISPLAY DEVICE AND METHOD OF DRIVING THE SAME

The application claims priority to Korean patent application number 10-2022-0087195, filed on Jul. 14, 2022, and all the benefits accruing therefrom under 35 U.S.C. § 119, the content of which in its entirety is herein incorporated by reference.

BACKGROUND

1. Technical Field

The technical field relate to a display device and a method of driving the same.

2. Related Art

With the development of information technology, the importance of a display device, which is a connection medium between a user and information, has been emphasized. Owing to the importance of the display device, the use of various kinds of the display device, such as a liquid crystal display device and an organic light-emitting display device, has increased.

An image frame to be displayed on the display device may be formed of grayscale values. In the case where the image frame includes only high grayscale values, overcurrent that exceeds a permitted limit may flow to the display device. Therefore, if it is expected that overcurrent will flow, the grayscale values are desirable to be scaled down so that current under the permitted limit can flow to the display device.

However, because a current image frame cannot be delayed if the display device has not a frame memory, a scale factor based on grayscale values of the current image frame cannot be applied to the current image frame. Therefore, overcurrent cannot be prevented from flowing to the display device, e.g., in a worst pattern in which a black image and a white image are converted to each other on a frame basis.

In this case, a voltage level of a high voltage power supply ELVDD connected to pixels of the display device is desirable to be reduced so that current flowing to light emitting diodes can be reduced, whereby overcurrent can be prevented from flowing to the display device.

However, in the case where the voltage level of the high voltage power supply ELVDD is reduced, a greenish phenomenon occurs due to a difference in efficiency between the pixels. As a result, the quality of the display image may be reduced.

SUMMARY

Various embodiments of the present disclosure relate to a display device which can prevent overcurrent and a greenish phenomenon from occurring in a worst pattern without including a frame memory, and a method of driving the display device.

An embodiment of the present disclosure provides: a display device including: a pixel component including pixels; a timing controller configured to calculate a load variation between previous input grayscale values corresponding to a previous frame and current input grayscale values corresponding to a current frame; a current sensor configured to sense a current flowing through the pixels during the current frame and generate a global current value for the sensed current, store time points at which the global current value becomes equal to preset threshold current values, respectively, and generate a global current variation rate corresponding to a section between the stored time points of the current frame; and a scale factor provider configured to control a scale factor in a period of the current frame in the case where the load variation is equal to or more than a reference load variation.

In an embodiment, in the case where the load variation is less than the reference load variation, the scale factor provider may fix the scale factor.

In an embodiment, the current sensor may calculate the global current variation rate corresponding to a single section of the period of the current frame.

In an embodiment, the single section may be between a time point at which the global current value becomes a first threshold current value and a time point at which the global current value becomes a second threshold current value greater than the first threshold current value, and the stored time points may include the first threshold current value and the second threshold current value.

In an embodiment, in the case where the global current variation rate is greater than a threshold current variation rate, the scale factor provider may reduce the scale factor to a target scale factor.

In an embodiment, the scale factor provider variably may reduce the scale factor according to the global current variation rate.

In an embodiment, in the case where the global current variation rate is equal to or less than a threshold current variation rate, the scale factor provider may fix the scale factor.

In an embodiment, the current sensor may calculate the global current variation rate corresponding to each of a plurality of sections of the period of the current frame.

In an embodiment, the plurality of sections may correspond to sections between the time points at which the global current value becomes equal to the preset threshold current values, respectively.

In an embodiment, in the case where the global current variation rate corresponding to each of the plurality of sections is greater than a threshold current variation rate set in the corresponding one of the plurality of sections, the scale factor provider may reduce the scale factor.

In an embodiment, the scale factor provider may variably reduce the scale factor according to the global current variation rate corresponding to each of the plurality of sections.

In an embodiment, the pixel component may include, when displaying an image corresponding to the current frame, a fixed scale factor area where the scale factor is fixed and a variable scale factor area where the scale factor is reduced.

In an embodiment, the scale factor in the variable scale factor area may linearly or non-linearly vary depending on a time point in the period of the current frame.

An embodiment of the present disclosure provides a method of driving a display device, including: calculating a load variation between previous input grayscale values corresponding to a previous frame and current input grayscale values corresponding to a current frame; sensing a current flowing through pixels during the current frame, and generating a global current value for the sensed current; and controlling a scale factor in a period of the current frame in the case where the load variation is equal to or more than a reference load variation.

In an embodiment, the method may further include fixing the scale factor in the case where the load variation is less than the reference load variation.

In an embodiment, controlling the scale factor may include: calculating a global current variation rate corresponding to a single section of the period of the current frame; and reducing the scale factor to a target scale factor in the case where the global current variation rate is greater than a threshold current variation rate.

In an embodiment, reducing the scale factor may include variably reducing the scale factor according to the global current variation rate.

In an embodiment, controlling the scale factor may include fixing the scale factor in the case where the global current variation rate is less than or equal to the threshold current variation rate.

In an embodiment, controlling the scale factor may include: calculating a global current variation rate corresponding to each of a plurality of sections of the period of the current frame; and reducing the scale factor in the case where the global current variation rate corresponding to each of the plurality of sections is greater than a threshold current variation rate set in the corresponding one of the plurality of sections.

In an embodiment, reducing the scale factor may include variably reducing the scale factor according to the global current variation rate corresponding to each of the plurality of sections.

DETAILED DESCRIPTION

Figure 1:
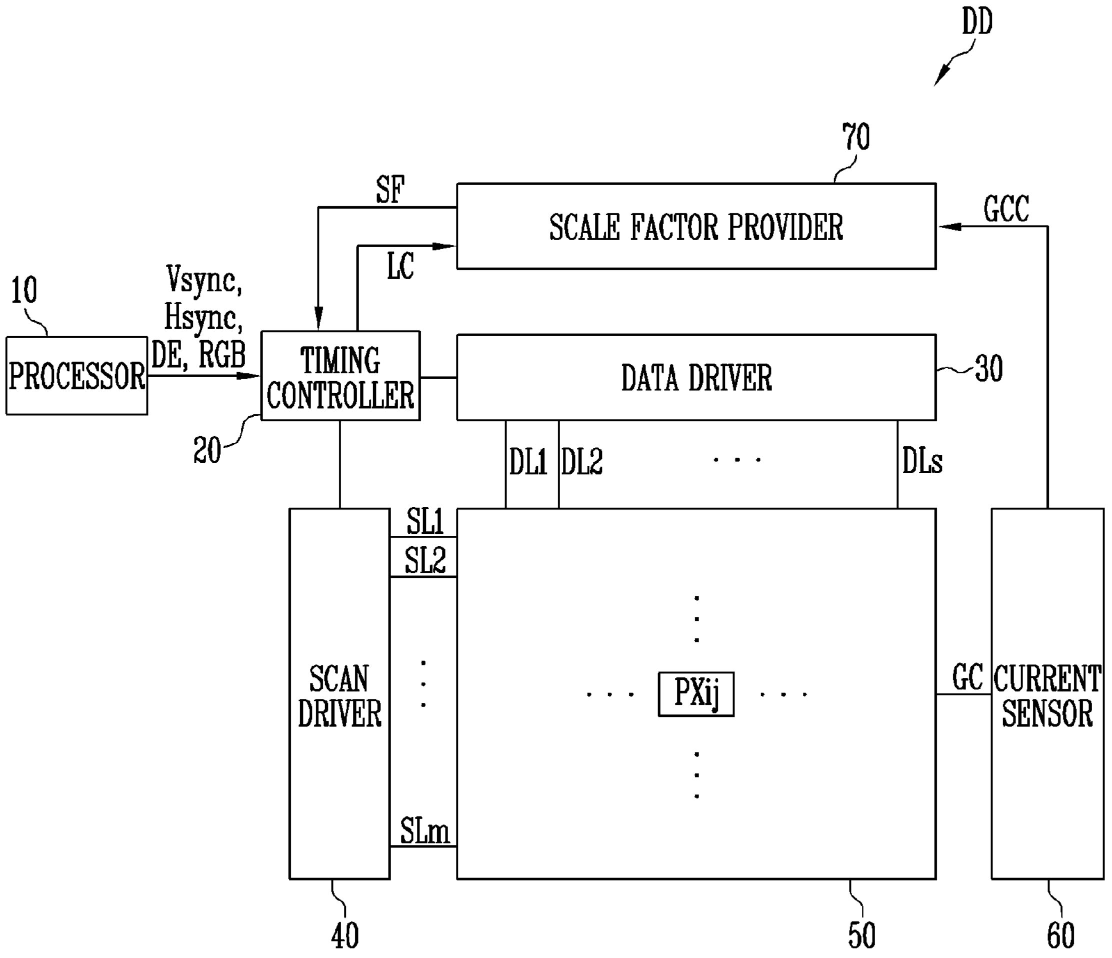
FIG. 1 is a diagram for describing a display device in accordance with an embodiment of the present disclosure.

Hereinafter, embodiments of the present invention will be described in detail with reference to the attached drawings, such that those skilled in the art can easily implement the present invention. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, the expression “being the same” may mean “being substantially the same”. In other words, the expression “being the same” may include a range that can be tolerated by those skilled in the art. The other expressions may also be expressions from which “substantially” has been omitted.

FIG. 1 is a diagram for describing a display device DD in accordance with an embodiment of the present disclosure.

Referring to FIG. 1, the display device DD in accordance with an embodiment of the present disclosure may include a processor 10, a timing controller 20, a data driver 30, a scan driver 40, a pixel component 50, a current sensor 60, and a scale factor provider 70.

The processor 10 may supply a vertical synchronization signal Vsync, a horizontal synchronization signal Hsync, a data enable signal DE, and input grayscale values RGB. The processor 10 may include a graphics processing unit (“GPU”), a central processing unit (“CPU”), an application processor (“AP”), or the like. The processor 10 may refer to a single integrated chip (“IC”), or a group formed of a plurality of ICs.

The processor 10 may supply the input grayscale values RGB during active periods of frame periods. Here, the processor 10 may use the data enable signal DE to inform whether the input grayscale values RGB are supplied. For example, the data enable signal DE may be at an enable level while the input grayscale values RGB are supplied, and may be at a disable level during the other periods. For example, the data enable signal DE may include enable-level pulses on a horizontal period basis, during each active period. The input grayscale values RGB may be supplied on a horizontal line basis in response to an enable-level pulse of the data enable signal DE. The horizontal line may refer to pixels (e.g., a pixel row) connected to the same scan line. For example, the horizontal line may refer to pixels, scan transistors of which are connected to the same scan line. The scan transistors each may refer to a transistor, a source or drain electrode of which is connected to a data line, and a gate electrode of which is connected to a scan line.

Cycles of the vertical synchronization signal Vsync may correspond to respective frame periods. Cycles of the horizontal synchronization signal Hsync may correspond to respective horizontal periods.

The timing controller 20 may receive the vertical synchronization signal Vsync, the horizontal synchronization signal Hsync, the data enable signal DE, and the input grayscale values RGB from the processor 10.

The timing controller 20 may supply respective control signals to the data driver 30, the scan driver 40, the pixel component 50, the current sensor 60, and the scale factor provider 70 in response to respective specifications thereof.

In an embodiment, the timing controller 20 may calculate a load value of input grayscale values received during each frame period. For example, the timing controller 20 may calculate a load value of input grayscale values (hereinafter, referred to as 'previous input grayscale values') received during a previous frame period, and a load value of input grayscale values (hereinafter, referred to as 'current input grayscale values') received during a current frame period.

The load value may correspond to the input grayscale values of each image frame. As the sum of input grayscale values of each image frame is increased, the load value of each image frame may be increased. For example, the load value in a full-white image frame may be 100, and the load value in a full-black image frame may be 0. Here, the term "full-while image frame" may refer to an image frame in which all of the pixels included in the pixel component 50 are set to the maximum grayscale values (or the white grayscale values) and emit light at the maximum luminance. The term "full-black image frame" may refer to an image frame in which all of the pixels included in the pixel component 50 are set to the minimum grayscale values (or the black grayscale values) and do not emit light. In other words, the load value may have a value ranging from 0 to 100.

In an embodiment, the timing controller 20 may calculate a load variation LC between the previous input grayscale values and the current input grayscale values. For example, the timing controller 20 may determine that a load variation LC between the previous input grayscale values corresponding to the full-black image frame and the current input grayscale values corresponding to the full-white image frame is 100%. For example, the timing controller 20 may determine that a load variation LC between the previous input grayscale values corresponding to the full-while image frame and the current input grayscale values corresponding to the full-white image frame is 0%. In other words, the load variation LC may have a value ranging from 0% to 100%. Furthermore, the timing controller 20 may provide the load variation LC to the scale factor provider 70.

In an embodiment, the timing controller 20 may receive a scale factor SF from the scale factor provider 70 and apply the scale factor SF to the input grayscale values RGB, so that the input grayscale values RGB may be converted into output grayscale values. For example, the timing controller 20 may generate the output grayscale values by multiplying the input grayscale values RGB by a corresponding scale factor SF, or by reducing the input grayscale values RGB at a certain rate corresponding to the scale factor SF. The output grayscale values may be identical to or less than the input grayscale values RGB. Furthermore, the timing controller 20 may provide the output grayscale values to the data driver 30.

The data driver 30 may generate, using the output grayscale values and control signals, data voltages to be provided to data lines D1, D2, . . . , DLs. For example, the data driver 30 may sample the output grayscale values using a clock signal, and apply data voltages corresponding to the output grayscale values to the data lines D1, D2, . . . , DLs on a pixel row basis. The pixel row may refer to pixels connected to the same scan line. Here, 's' is an integer greater than 0.

The scan driver 40 may receive a clock signal, a scan start signal, and the like from the timing controller 20, and generate scan signals to be provided to the scan lines SL1, SL2, . . . , SLm. Here, 'm' is an integer greater than 0.

The scan driver 40 may sequentially supply scan signals each having a turn-on level pulse to the scan lines SL1, SL2, . . . , SLm. The scan driver 40 may include scan stages configured in the form of a shift register. The scan driver 40 may generate scan signals in such a way as to sequentially transmit a scan start signal having a turn-on level pulse to a subsequent scan stage under the control of a clock signal.

The current sensor 60 may sense current flowing through the pixels at a certain section interval and generate a global current value GC. Here, the global current value GC may be defined as the sum of the values of divided current flowing to respective light emitting diodes of the pixels. For example, the value of current flowing to a first power line ELVDDL or a second power supply line ELVSSL before the current is divided into parts that flow to the pixels may be the global current value GC.

In an embodiment, the current sensor 60 may store time points at which the global current value GC becomes equal to respective preset threshold current values, and may generate a global current variation rate GCC corresponding to a section between the stored time points. Furthermore, the current sensor 60 may provide the global current variation rate GCC to the scale factor provider 70. Here, global current variation rate GCC may mean a change amount of the global current value GC per unit time. Description pertaining to the foregoing will be made below with reference to FIGS. 5 to 7.

The scale factor provider 70 may determine whether to control the scale factor SF depending on the load variation LC and the global current variation rate GCC. For example, the scale factor provider 70 may determine whether to control the scale factor SF depending on a result of comparison between the load variation LC and a reference load variation RLC. For example, the scale factor provider 70 may determine whether to control the scale factor SF depending on a result of comparison between the global current variation rate GCC and a threshold current variation rate TCC. Here, the threshold current variation rate TCC may be a threshold value of the global current variation rate GCC. Description pertaining to the foregoing will be made below with reference to FIGS. 3 to 7.

The scale factor provider 70 may control the scale factor SF in each frame. In an embodiment, in the case where the load variation LC is greater than the reference load variation RLC and the global current variation rate GCC is greater than the threshold current variation rate TCC, the scale factor provider 70 may reduce the scale factor SF to a target scale factor value in a current frame. Description pertaining to the foregoing will be made below with reference to FIG. 4.

The pixel component 50 includes pixels. Each pixel PXij may be connected to a corresponding data line and a corresponding scan line. Here, 'i' and 'j' each may be an integer greater than 0. The pixel PXij may refer to a pixel, a scan transistor of which is connected to an i-th scan line and a j-th data line.

Although not illustrated, the display device DD may further include an emission driver. The emission driver may receive a clock signal, an emission stop signal, and the like from the timing controller 20, and generate emission signals to be provided to emission lines. For example, the emission driver may include emission stages connected to the emission lines. The emission stages may be configured in the form of a shift register. For example, a first emission stage may generate a turn-off level emission signal based on a turn-off level emission stop signal. The other emission stages may sequentially generate turn-off level emission signals based on respective turn-off level emission signals of corresponding previous emission stages.

If the display device DD includes the above-mentioned emission driver, each pixel PXij may further include a transistor connected to the corresponding emission line. The transistor may be turned off during a data write period of each pixel PXij, thus preventing the pixel PXij from emitting light. The following description will be made under the assumption that the emission driver is not provided.

Figure 2:
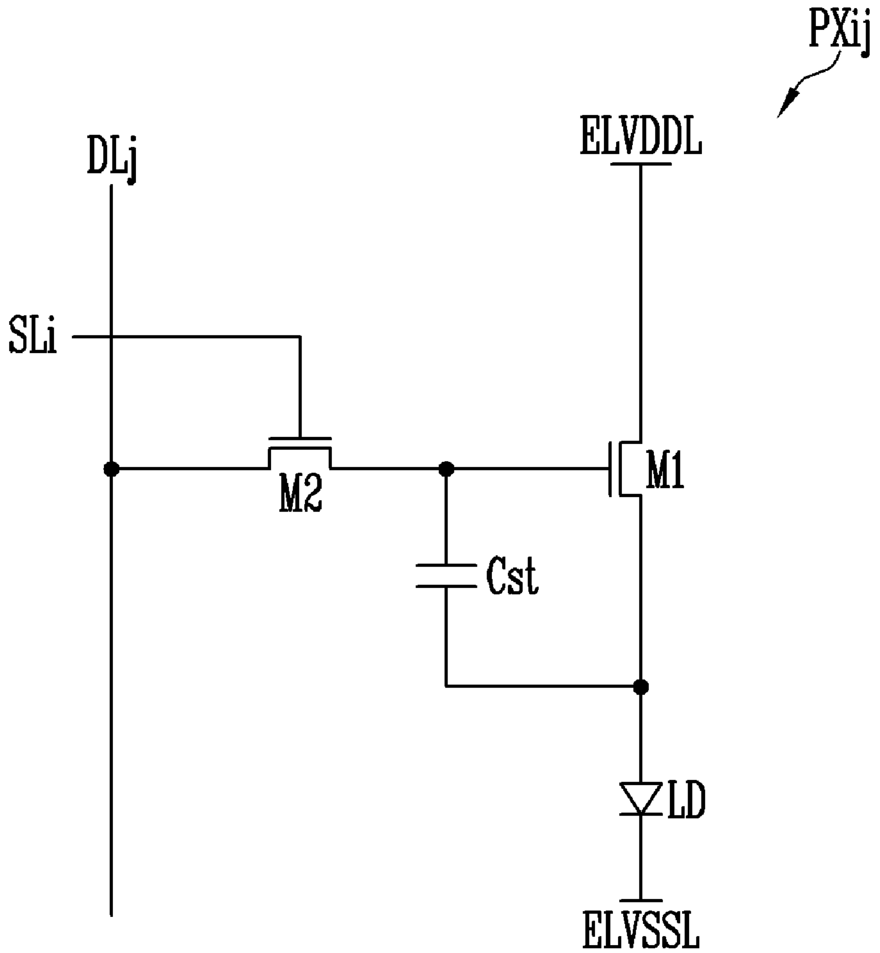
FIG. 2 is a diagram for describing a pixel in accordance with an embodiment of the present disclosure.

FIG. 2 is a diagram for describing a pixel PXij in accordance with an embodiment of the present disclosure.

Referring to FIG. 2, the pixel PXij may include transistors M1 and M2, a storage capacitor Cst, and a light emitting diode LD.

Hereinafter, a circuit configured of N-type transistors will be described by way of example. However, those skilled in the art may design a circuit configured of P-type transistors by changing the polarity of the voltage to be applied to a gate terminal of each transistor. Likewise, those skilled in this art may design a circuit configured of a combination of a P-type transistor and an N-type transistor. The term "P-type transistor" is a general name for transistors in which the amount of flowing current increases when a voltage difference between a gate electrode and a source electrode increases in a negative direction. The term "N-type transistor" is a general name for transistors in which the amount of flowing current increases when a voltage difference between a gate electrode and a source electrode increases in a positive direction. Each transistor may be configured in various forms such as a thin film transistor ("TFT"), a field effect transistor ("FET"), and a bipolar junction transistor ("BJT").

The first transistor M1 may include a gate electrode connected to a first electrode of the storage capacitor Cst, a first electrode connected to the first power line ELVDDL, and a second electrode connected to a second electrode of the storage capacitor Cst. The first transistor M1 may be referred to as a driving transistor.

The second transistor M2 may include a gate electrode connected to an i-th scan line SLi1, a first electrode connected to a j-th data line DLj, and a second electrode connected to the gate electrode of the first transistor M1. The second transistor M2 may be referred to as "scan transistor".

The first electrode of the storage capacitor Cst may be connected to the gate electrode of the first transistor M1. The second electrode of the storage capacitor Cst may be connected to the second electrode of the first transistor M1.

The light emitting diode LD may include an anode connected to the second electrode of the first transistor M1, and a cathode connected to the second power line ELVSSL. The light emitting diode LD may be formed of an organic light emitting diode, an inorganic light emitting diode, a quantum dot/well light emitting diode, or the like. Although there is illustrated an example in which the pixel PXij of FIG. 2 includes one light emitting diode LD, the pixel PXij may include a plurality of diodes connected in series, parallel, or series-parallel to each other in other embodiments.

A first power voltage may be applied to the first power line ELVDDL. A second power voltage may be applied to the second power line ELVSSL. For example, the first power voltage may be greater than the second power voltage during an image display period.

If a turn-on level (here, a logic high level) scan signal is applied through the scan line SLi, the second transistor M2 is turned on. Here, a data voltage applied to the data line DLj may be stored in the first electrode of the storage capacitor Cst.

Driving current corresponding to a difference in voltage between the first electrode and the second electrode of the storage capacitor Cst may flow between the first electrode and the second electrode of the first transistor M1. Therefore, the light emitting diode LD may emit light at a luminance corresponding to the data voltage.

Next, if a turn-off level (here, a logic low level) scan signal is applied through the scan line SLi, the second transistor M2 may be turned off, and the data line DLj and the first electrode of the storage capacitor Cst may be electrically separated from each other. Hence, the data voltage of the data line DLj changes, the storage stored in the first electrode of the storage capacitor Cst may not change.

Embodiments may be applied not only to the pixel PXij of FIG. 2 but also to pixels of other pixel circuits. For example, in the case where the display device DD further includes the emission driver, the pixel PXij may further include a transistor connected to the corresponding emission line.

Figure 3:
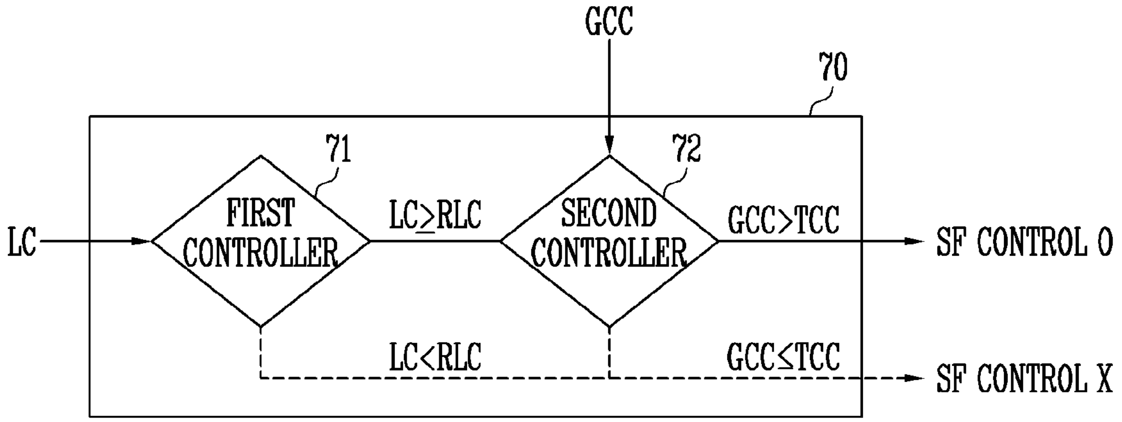
FIG. 3 is a diagram for describing a scale factor provider in accordance with an embodiment of the present disclosure.

FIG. 3 is a diagram for describing a scale factor provider in accordance with an embodiment of the present disclosure.

Referring to FIG. 3, the scale factor provider 70 in accordance with an embodiment of the present disclosure may include a first controller 71 and a second controller 72.

The first controller 71 may compare a load variation LC between previous input gray scale values and current input gray scale values that is received from the timing controller 20 to the reference load variation RLC, and determine whether to operate the second controller 72.

In an embodiment, in the case where the load variation LC is the reference load variation RLC or more, the first controller 71 may determine to allow the scale factor SF to be controlled by the second controller 72, and transmit a result thereof to the second controller 72. In other words, in the case where the load variation LC is equal to the reference load variation RLC, the first controller 71 may transmit the result to the second controller 72 to enable the scale factor SF to be controlled in the second controller 72, rather than directly controlling the scale factor SF. On the other hand, in the case where the load variation LC is less than the reference load variation RLC, the first controller 71 may determine not to control the scale factor SF (or may determine to fix the scale factor SF). In other words, in the case where the load variation LC is less than the reference load variation RLC, the first controller 71 may determine that the scale factor SF is not to be controlled (or the scale factor SF is to be fixed), regardless of the second controller 72. Here, the reference load variation RLC may be a threshold value under which rush current occurs due to a difference between the load value of the previous input grayscale value and the load value of the current input grayscale value whereby overcurrent may flow to the display device DD. For example, the reference load variation RLC may be set to 20%, but the present disclosure is not limited thereto. In other words, the reference load variation RLC may be set to various values depending on specifications of the display device DD.

As such, the first controller 71 determines that the scale factor SF is to be controlled only in the case where the load variation LC between image frames is equal to the reference load variation RLC, thus preventing overcurrent from flowing to the display device DD.

The second controller 72 may compare the global current variation rate GCC received from the current sensor 60 with the threshold current variation rate TCC and determine whether to control the scale factor.

In an embodiment, in the case where the global current variation rate GCC is greater than the threshold current variation rate TCC, the second controller 72 may control the scale factor SF in a current frame. For example, in the case where the global current variation rate GCC is greater than the threshold current variation rate TCC, the second controller 72 may reduce the scale factor SF to a target scale factor value in the current frame, so that the global current variation rate GCC may be reduced, whereby overcurrent can be prevented from flowing to the display device DD. On the other hand, in the case where the global current variation rate GCC is less than or equal to the threshold current variation rate TCC, the second controller 72 may not control the scale factor SF (or may fix the scale factor SF). Here, the threshold current variation rate TCC may be a set value which is a criterion for controlling the scale factor SF, and may refer to a maximum current variation rate that does not exceed a current limit value CLM. For example, the threshold current variation rate TCC may be set to a value obtained by dividing the current limit value CLM by the current frame period. Here, the current limit value CLM may be set to various values depending on specifications of the display device DD, so that the threshold current variation rate TCC may also be set to various values.

As such, the second controller 72 controls the scale factor SF within the current frame (or each frame) only in the case where the global current variation rate GCC is greater than the threshold current variation rate TCC, so that overcurrent can be prevented from flowing to the display device DD that does not include a frame memory. Furthermore, the second controller 72 may control the scale factor SF in the current frame with the first power voltage ELVDD remaining constant, so that a greenish phenomenon can be effectively prevented from occurring due to a reduction of the first power voltage ELVDD.

Figure 4:
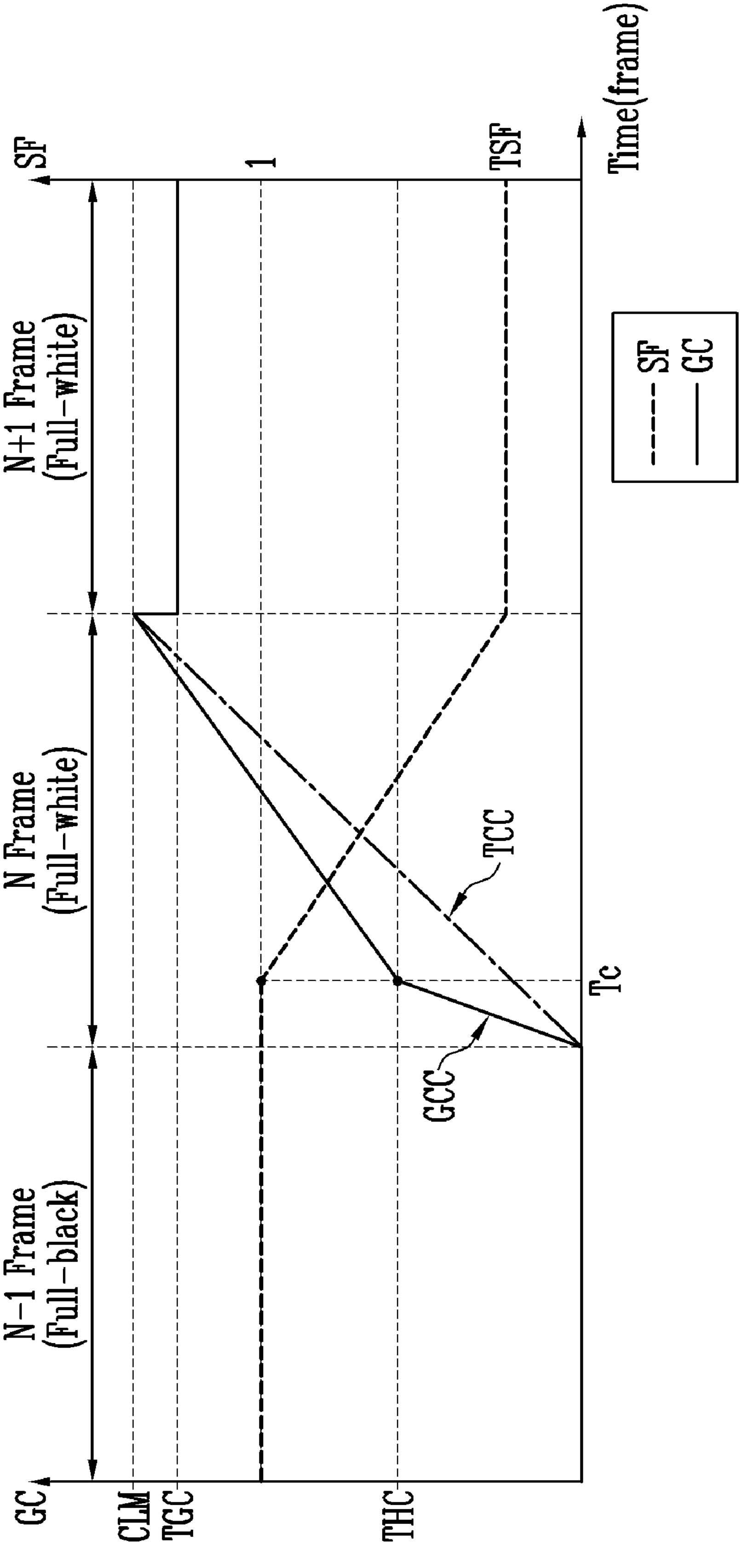
FIGS. 4 to 6 are diagrams for describing a method of driving the display device in accordance with an embodiment of the present disclosure.
Figure 5:
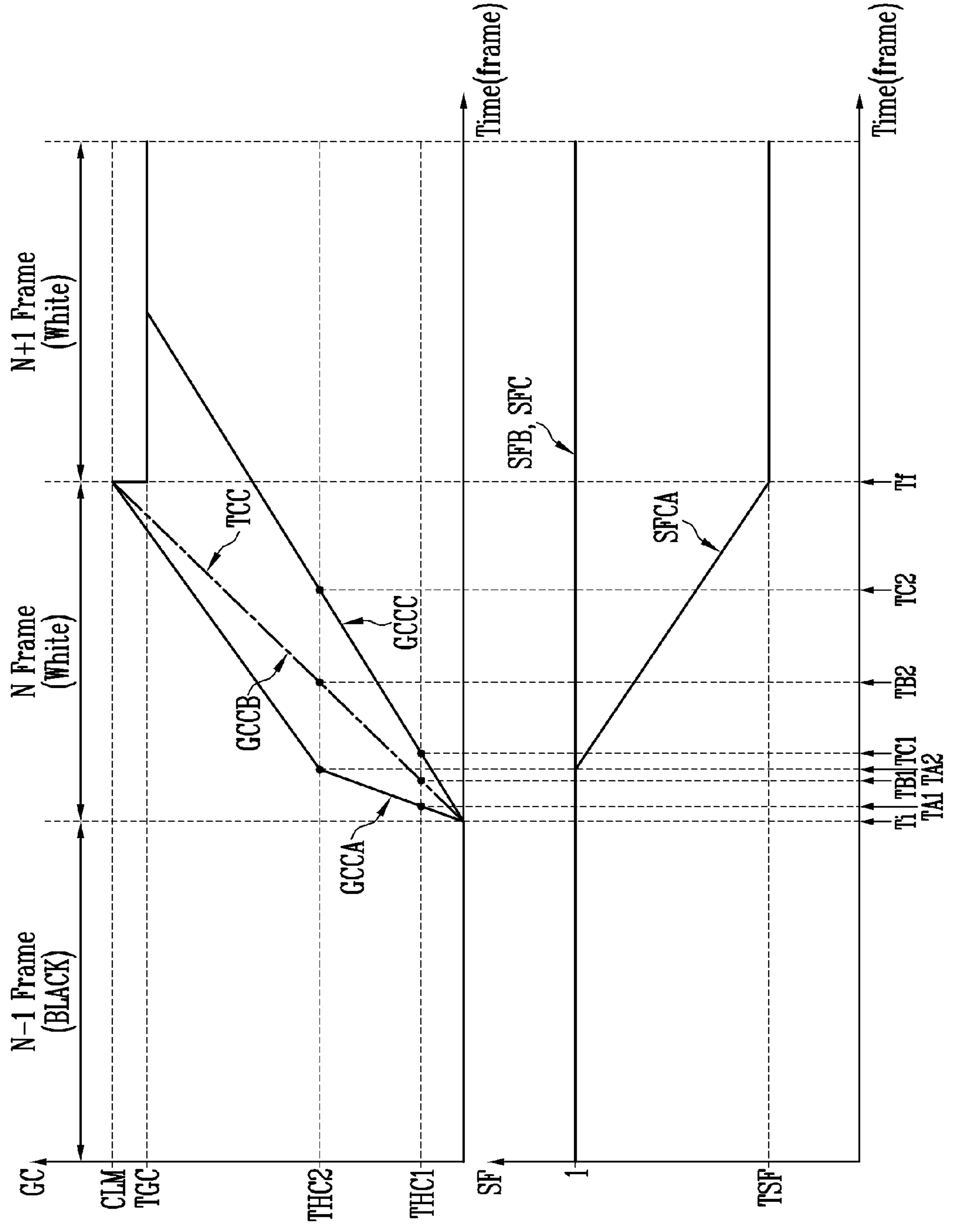
Figure 6:
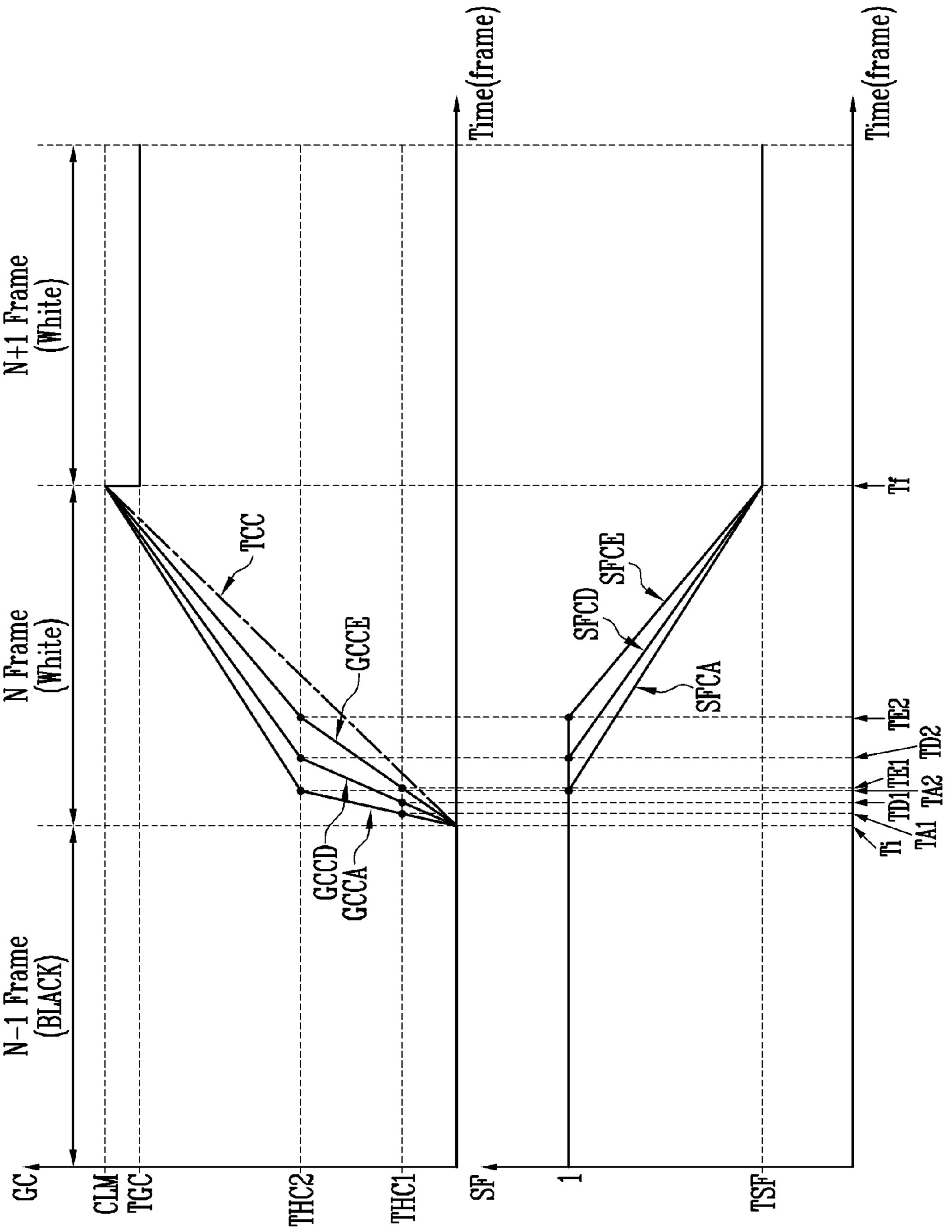

FIGS. 4 to 6 are diagrams for describing a method of driving the display device in accordance with an embodiment of the present disclosure.

FIGS. 4 to 6 illustrate the global current value GC and the scale factor SF according to the time of an N−1-th frame corresponding to a full-black image, and an N-th frame, and an N+1-th frame which correspond to a full-white image. Here, the N−1-th frame may correspond to a previous frame, the N-th frame may correspond to a current frame, and the N+1-th frame may correspond to a subsequent frame.

Referring to FIG. 4, during the N−1-th frame period, the full-black image is displayed, so that the global current value GC may be maintained at 0. The timing controller 20 may determine that the load value of input grayscales values received during the N−1-th frame period is 0. The scale factor provider 70 may maintain the scale factor SF at the maximum value because the load value of the input grayscale values is a minimum value. Here, the scale factor SF may be 1.

Because the full-white image is displayed during the N-th frame period, the global current value GC may be continuously increased to the current limit value CLM. The timing controller 20 may determine that the load value of input grayscales values received during the N-th frame period is 100, and the load variation LC between the N−1-th input grayscale values and the N-th input grayscale values is 100%. The current sensor 60 may calculate the global current variation rate GCC at a time point Tc at which the global current value GC becomes a threshold current value THC or more. The scale factor provider 70 may determine to allow the scale factor SF to be controlled because the load variation LC is 100% which is greater than the reference load variation RLC. Furthermore, the scale factor provider 70 may reduce the scale factor SF to a target scale factor value TSF because the global current variation rate GCC is greater than the threshold current variation rate TCC. In FIG. 4, the threshold current variation rate TTC has a value of a slope of the dot-dash line while the global current variation rate GCC has a value of a slope of the solid line expressing the global current value GC.

Here, the target scale factor value TSF is for preventing the light emitting diode from being degraded, and may vary depending on the load value of the input grayscale values RGB. For example, as the load value of the input grayscale values RGB is increased, a value set as the target scale factor value TSF is decreased.

In the N-th frame, as the scale factor SF is reduced, the global current variation rate GCC is reduced, so that overcurrent that exceeds the current limit value CLM can be prevented from flowing to the display device DD.

In the N+1-th frame period, the full-white image is displayed, and the target global current value TGC may flow because the scale factor SF is controlled in the N-th frame. The timing controller 20 may determine that the load value of input grayscales values received during the N+1-th frame period is 100, and the load variation LC between the N-th input grayscale values and the N+1-th input grayscale values is 0%. The scale factor provider 70 may not control the scale factor SF because the load variation LC is 0% which is less than the reference load variation RLC. In other words, during the N+1-th frame period, the target scale factor value TSF may be maintained.

Referring to FIG. 5, in the N-th frame in which the load variation LC is relatively large, the current sensor 60 may calculate a global current variation rate GCC corresponding to a single section. Here, the global current variation rate GCC may vary due to factors other than the global current value GC even though the same grayscale value is supplied. For example, the global current variation rate GCC may vary due to various factors such as external lighting, a degree to which the pixel has been degraded, and the temperature.

For example, the current sensor 60 may store a time point TA1 at which the global current value GC becomes a first threshold current value THC1 and a time point TA2 at which the global current value GC becomes a second threshold current value THC2 greater than first threshold current value THC1, and may calculate a global current variation rate GCCA corresponding to a single section between the stored time points TA1 and TA2.

For another example, the current sensor 60 may store a time point TB1 at which the global current value GC becomes the first threshold current value THC1 or more and a time point TB2 at which the global current value GC becomes the second threshold current value THC2 or more, and may calculate a global current variation rate GCCB corresponding to a single section between the stored time points TB1 and TB2.

For still another example, the current sensor 60 may store a time point TC1 at which the global current value GC becomes the first threshold current value THC1 or more and a time point TC2 at which the global current value GC becomes the second threshold current value THC2 or more, and may calculate a global current variation rate GCCC corresponding to a single section between the stored time points TC1 and TC2.

Furthermore, the scale factor provider 70 may determine whether to control the scale factor SF depending on a result of comparison between the global current variation rate GCC and the threshold current variation rate TCC.

For example, in the case where the global current variation rate GCCA is greater than the threshold current variation rate TCC, the scale factor provider 70 may reduce the scale factor SF to the target scale factor value TSF. On the other hand, in the case where the global current variation rate GCCB or GCCC is less than or equal to the threshold current variation rate TCC, the scale factor provider 70 may fix the scale factor SF.

Referring to FIG. 6, the scale factor provider 70 may variably reduce the scale factor SF depending on the global variation rate GCC in the case where the global current variation rate GCC is greater than the threshold current variation rate TCC. In the same manner as the case of FIG. 5, the current sensor 60 may store a time point TA1, TD1, TE1 at which the global current value GC becomes the first threshold current value THC1 or more and a time point TA2, TD2, TE2 at which the global current value GC becomes the second threshold current value THC2 or more, and may calculate a global current variation rate GCCA, GCCD, GCCE corresponding to a single section between the stored time points TA1 and TA2, TD1 and TD2, TE1 and TE2. Furthermore, in the same manner as the case of FIG. 5, the global current variation rate GCC may vary due to factors other than the global current value GC even though the same grayscale value is supplied. For example, the global current variation rate GCC may vary due to various factors such as external lighting, a degree to which the pixel has been degraded, and the temperature.

For example, in the case where the global current variation rate GCCA is large, the scale factor provider 70 may reduce the scale factor SF at a scale factor reduction rate SFCA.

For example, in the case where the global current variation rate GCCD is less than the global current variation rate GCCA and greater than the global current variation rate GCCE, the scale factor provider 70 may reduce the scale factor SF at a scale factor reduction rate SFCD.

For example, in the case where the global current variation rate GCCE is less than the global current variation rate GCCD, the scale factor provider 70 may reduce the scale factor SF to the target scale factor value TSF at the scale factor reduction rate SFCE.

Figure 7:
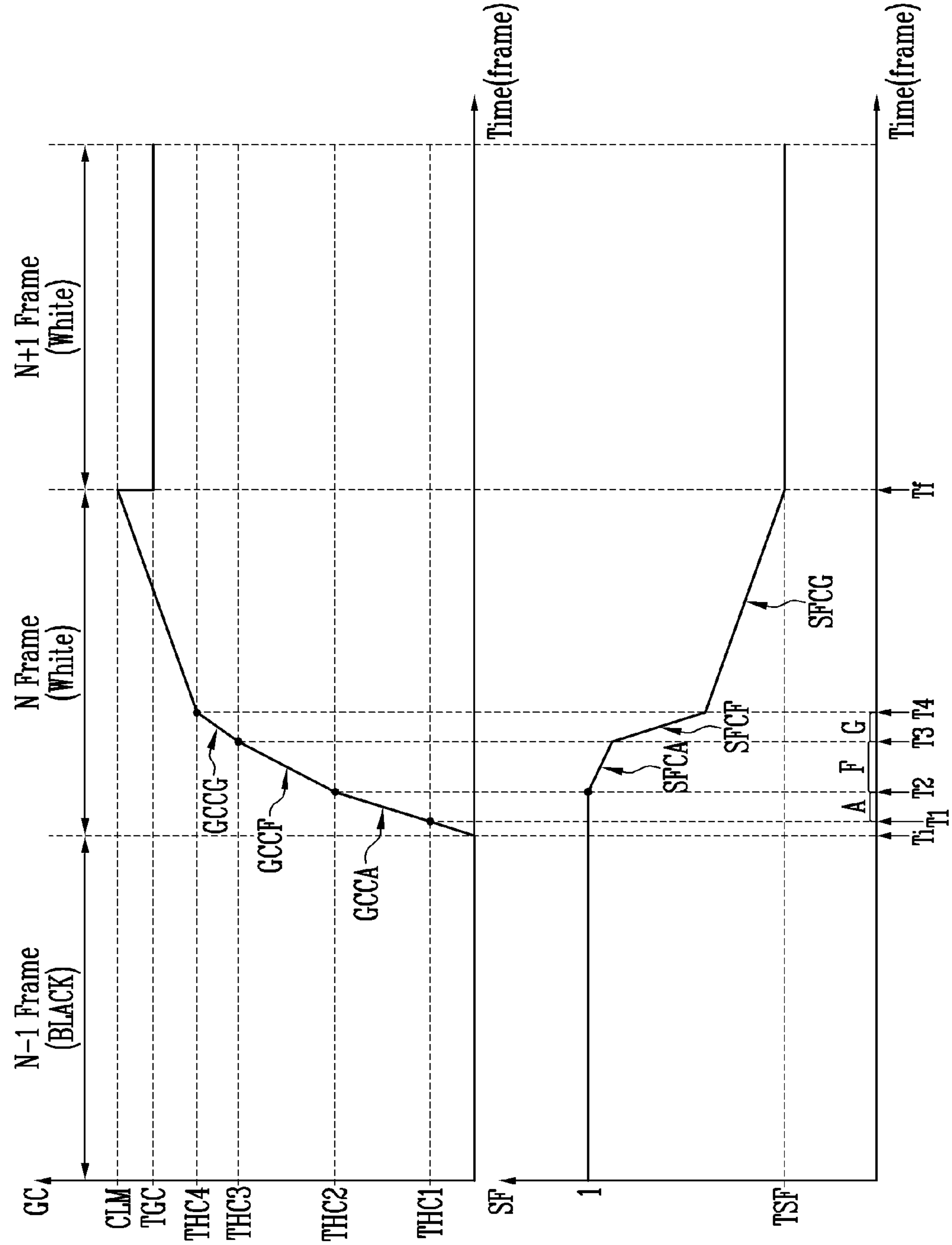
FIG. 7 is a diagram for describing a method of driving the display device in accordance with an embodiment of the present disclosure.

FIG. 7 is a diagram for describing a method of driving the display device in accordance with an embodiment of the present disclosure. With regard to FIG. 7, description that overlaps that of the embodiment of FIGS. 4 to 6 will be omitted.

Referring to FIG. 7, in the N-th frame in which the load variation LC is relatively large, the current sensor 60 may calculate a global current variation rate GCC corresponding to each of a plurality of sections. In the case where the global current variation rate GCC corresponding to each of the plurality of sections is greater than a threshold current variation rate (not illustrated) set in the corresponding one of the plurality of sections, the scale factor provider 70 may variably reduce the scale factor SF according to the global current variation rate corresponding to each of the plurality of sections.

For example, the current sensor 60 may store a time point T1 at which the global current value GC becomes a first threshold current value THC1 or more and a time point T2 at which the global current value GC becomes a second threshold current value THC2 or more, and may calculate a global current variation rate GCCA corresponding to section A between the stored time points T1 and T2. The scale factor provider 70 may reduce the scale factor SF at a scale factor reduction rate SFCA in the case where the global current variation rate GCCA is greater than a threshold current variation rate set in the corresponding section A.

Subsequently, the current sensor 60 may store a time point T3 at which the global current value GC becomes a third threshold current value THC3 or more, and calculate a global current variation rate GCCF corresponding to section F between the stored time points T2 and T3. The scale factor provider 70 may reduce the scale factor SF at a scale factor reduction rate SFCF in the case where the global current variation rate GCCF is greater than a threshold current variation rate set in the corresponding section F.

Subsequently, the current sensor 60 may store a time point T4 at which the global current value GC becomes a fourth threshold current value THC4 or more, and calculate a global current variation rate GCCG corresponding to section G between the stored time points T3 and T4. The scale factor provider 70 may reduce the scale factor SF to the target scale factor value TSF at a scale factor reduction rate SFCG in the case where the global current variation rate GCCG is greater than a threshold current variation rate set in the corresponding section G.

Figure 8:
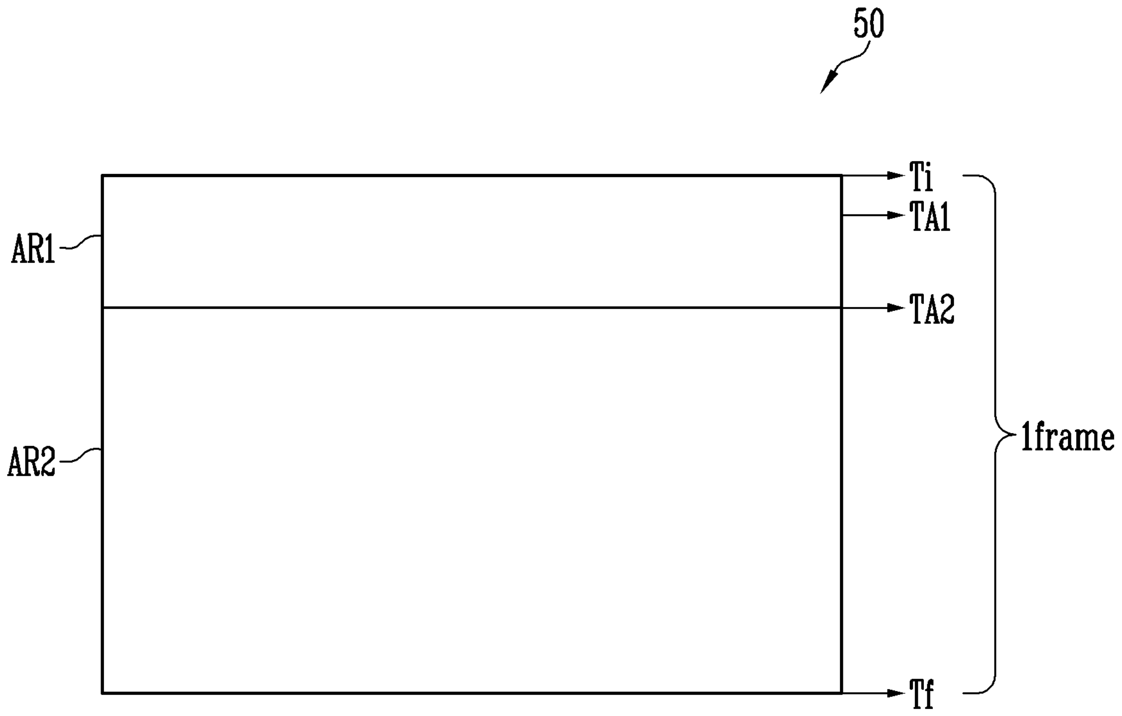
FIG. 8 is a diagram for describing a pixel component according to the display device driving method illustrated in FIGS. 5 and 6.

FIG. 8 is a diagram for describing a pixel component 50 according to the display device driving method illustrated in FIGS. 5 and 6. In FIG. 8, there is illustrated the pixel component 50 in the case a full-white image corresponding to the N-th frame illustrated in FIGS. 5 and 6 is displayed. With regard to FIG. 8, description will be made on the assumption that the scale factor SF is controlled according to the global current variation rate GCCA of a single section (the section between TA1 and TA2) in one frame period.

Referring to FIGS. 5, 6, and 8, in the case where the scale factor SF is controlled according to the global current variation rate GCCA of a single section (the section between TA1 and TA2) in one frame period, the pixel component 50 may include a fixed scale factor area AR1 and a variable scale factor area AR2.

The fixed scale factor area AR1 may correspond to an image to be displayed between a time point Ti at which the N-th frame period begins and a time point TA2 at which the scale factor SF begins to be controlled (or a time point at which the global current value GC becomes the second threshold current value THC2 or more). In the fixed scale factor area AR1, the scale factor SF is fixed to a scale factor value (e.g., 1) applied to the N−1-th frame, so that a full-white image may be displayed without a reduction in luminance.

The variable scale factor area AR2 may correspond to an image to be displayed between the time point TA2 at which the scale factor SF begins to be controlled and a time point Tf at which the N-th frame period ends. In the variable scale factor area AR2, the scale factor SF is linearly reduced to the target scale factor value TSF at the scale factor reduction rate SFCA, so that a full-white image the luminance of which is gradually reduced may be displayed.

Figure 9:
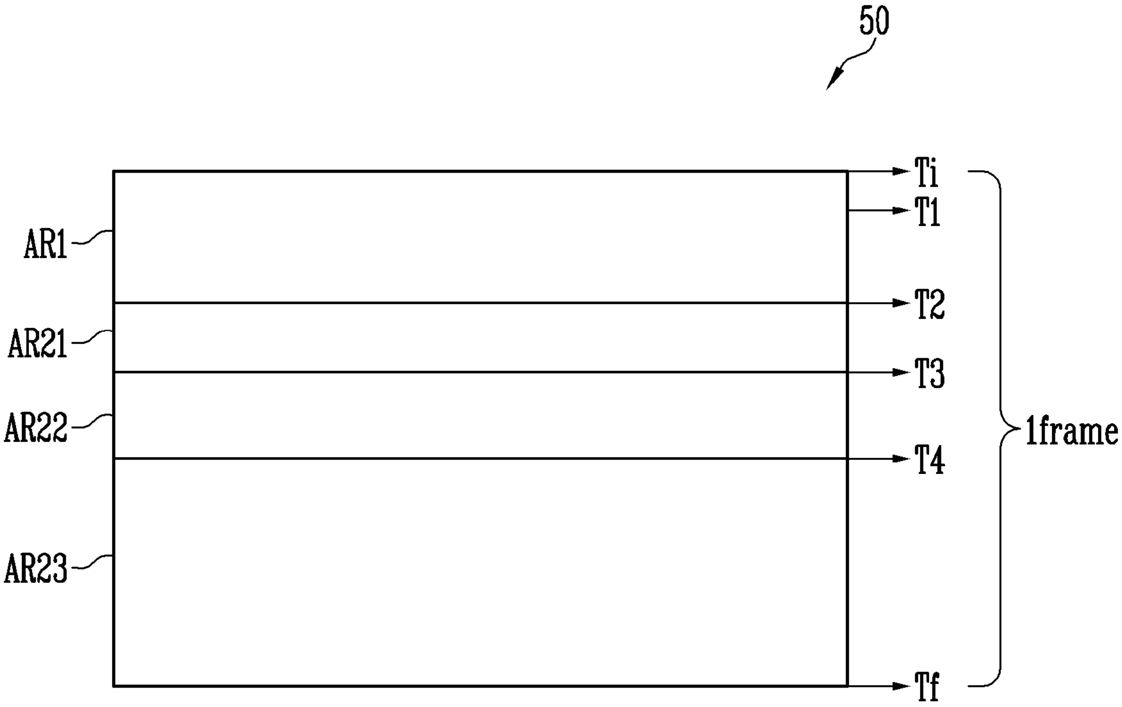
FIG. 9 is a diagram for describing a pixel component according to the display device driving method illustrated in FIG. 7.

FIG. 9 is a diagram for describing the pixel component 50 according to the display device driving method illustrated in FIG. 7. In FIG. 9, there is illustrated the pixel component 50 in the case a full-white image corresponding to the N-th frame illustrated in FIG. 7 is displayed.

Referring to FIGS. 7 and 9, in the case where the scale factor SF is controlled in each of a plurality of sections A, F, and G in one frame period, the pixel component 50 may include a fixed scale factor area AR1 and a plurality of variable scale factor areas AR21, AR22, and AR23.

The fixed scale factor area AR1 may correspond to an image to be displayed between a time point Ti at which the N-th frame period begins and a time point T2 at which the scale factor SF begins to be controlled (or a time point at which the global current value GC becomes the second threshold current value THC2 or more). In the fixed scale factor area AR1, the scale factor SF is fixed to a scale factor value (e.g., 1) applied to the N−1-th frame, so that a full-white image may be displayed without a reduction in luminance.

A first variable scale factor area AR21 may correspond to an image to be displayed during a period in which the scale factor SF is reduced at the scale factor reduction rate SFCA according to the global current variation rate GCCA of section A (i.e., the section between T1 and T2). A second variable scale factor area AR22 may correspond to an image to be displayed during a period in which the scale factor SF is reduced at the scale factor reduction rate SFCF according to the global current variation rate GCCA of section F (i.e., the section between T2 and T3). A third variable scale factor area AR23 may correspond to an image to be displayed during a period in which the scale factor SF is reduced at the scale factor reduction rate SFCG according to the global current variation GCCG of section G (i.e., the section between T3 and T4). In other words, different scale factor reduction rates may be applied to the plurality of variable scale factor areas AR21, AR22, and AR33, so that the scale factor SF is non-linearly reduced, whereby a full-white image having a varying luminance distribution can be displayed. Therefore, a difference in luminance that can be recognized by the user in one frame can be controlled by adjusting each scale factor reduction rate.

A display device and a method of driving the display device in accordance with an embodiment of the present disclosure may effectively prevent overcurrent and a greenish phenomenon from occurring in a worst pattern without including a frame memory.

As used in connection with various embodiments of the disclosure, the scale factor provider 70 may be implemented in hardware, software, or firmware, for example, implemented in a form of an application-specific integrated circuit (ASIC).

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the bounds and scope of the present disclosure should be determined by the technical spirit of the following claims.

What is claimed is:

1. A display device comprising:

a pixel component including pixels;

a timing controller configured to calculate a load variation between previous input grayscale values corresponding to a previous frame and current input grayscale values corresponding to a current frame;

a current sensor configured to sense a current flowing through the pixels during the current frame and generate a global current value for the sensed current, store time points at which the global current value becomes equal to preset threshold current values, respectively, and generate a global current variation rate corresponding to a section between the stored time points of the current frame; and a scale factor provider configured to control a scale factor in a period of the current frame in a case where the load variation is equal to or more than a reference load variation.

2. The display device according to claim 1, wherein, in a case where the load variation is less than the reference load variation, the scale factor provider fixes the scale factor.

3. The display device according to claim 1, wherein the current sensor calculates the global current variation rate corresponding to a single section of the period of the current frame.

4. The display device according to claim 3, wherein the single section is between a time point at which the global current value becomes a first threshold current value and a time point at which the global current value becomes a second threshold current value greater than the first threshold current value, and the stored time points include the first threshold current value and the second threshold current value.

5. The display device according to claim 3, wherein, in a case where the global current variation rate is greater than a threshold current variation rate, the scale factor provider reduces the scale factor to a target scale factor.

6. The display device according to claim 5, wherein the scale factor provider variably reduces the scale factor according to the global current variation rate.

7. The display device according to claim 3, wherein, in a case where the global current variation rate is equal to or less than a threshold current variation rate, the scale factor provider fixes the scale factor.

8. The display device according to claim 1, wherein the current sensor calculates the global current variation rate corresponding to each of a plurality of sections of the period of the current frame.

9. The display device according to claim 8, wherein the plurality of sections correspond to sections between the time points at which the global current value becomes equal to the preset threshold current values, respectively.

10. The display device according to claim 8, wherein, in a case where the global current variation rate corresponding to each of the plurality of sections is greater than a threshold current variation rate set in a corresponding one of the plurality of sections, the scale factor provider reduces the scale factor.

11. The display device according to claim 10, wherein the scale factor provider variably reduces the scale factor according to the global current variation rate corresponding to each of the plurality of sections.

12. The display device according to claim 1, wherein the pixel component includes, when displaying an image corresponding to the current frame, a fixed scale factor area where the scale factor is fixed and a variable scale factor area where the scale factor is reduced.

13. The display device according to claim 12, wherein the scale factor in the variable scale factor area linearly or non-linearly varies depending on a time point in the period of the current frame.

14. A method of driving a display device, comprising:

calculating a load variation between previous input grayscale values corresponding to a previous frame and current input grayscale values corresponding to a current frame;

sensing a current flowing through pixels during the current frame, and generating a global current value for the sensed current; and controlling a scale factor in a period of the current frame in a case where the load variation is equal to or more than a reference load variation.

15. The method according to claim 14, further comprising fixing the scale factor in a case where the load variation is less than the reference load variation.

16. The method according to claim 14, wherein controlling the scale factor comprises:

calculating a global current variation rate corresponding to a single section of the period of the current frame; and reducing the scale factor to a target scale factor in a case where the global current variation rate is greater than a threshold current variation rate.

17. The method according to claim 16, wherein reducing the scale factor comprises variably reducing the scale factor according to the global current variation rate.

18. The method according to claim 16, wherein controlling the scale factor comprises:

fixing the scale factor in a case where the global current variation rate is less than or equal to the threshold current variation rate.

19. The method according to claim 14, wherein controlling the scale factor comprises:

calculating a global current variation rate corresponding to each of a plurality of sections of the period of the current frame; and reducing the scale factor in a case where the global current variation rate corresponding to each of the plurality of sections is greater than a threshold current variation rate set in a corresponding one of the plurality of sections.

20. The method according to claim 19, wherein reducing the scale factor comprises variably reducing the scale factor according to the global current variation rate corresponding to each of the plurality of sections.

* * * * *